UNITED STATES PATENT OFFICE.

JOSEPH ROHNER, OF BASLE, SWITZERLAND, ASSIGNOR TO THE SOCIETY OF CHEMICAL INDUSTRY, OF SAME PLACE.

PRODUCTION OF NEW COLORING-MATTER.

SPECIFICATION forming part of Letters Patent No. 365,409, dated June 28, 1887.

Application filed August 25, 1886. Serial No. 211,790. (Specimens.) Patented in Germany July 22, 1886, No. 3,013.

*To all whom it may concern:*

Be it known that I, JOSEPH ROHNER, a citizen of Switzerland, residing at Basle, Switzerland, have invented new and useful Improvements in the Production of Dye-Stuffs or Coloring-Matters Suitable for Dyeing and Printing by the action of Metaphenylenediamine and its Homologues upon Diazoazo Compounds and their Sulpho-Acids, of which the following is a specification.

This invention relates to the production of dye-stuffs or coloring-matters suitable for dyeing and printing by the action of metaphenylenediamine and its homologues upon diazoazo compounds and their sulpho-acids.

The following may be given as an example: Ten kilos of amidoazo-benzole are finely ground together with a little water and twelve kilos of muriatic acid diluted until the volume reaches two hundred liters. Then a solution of 3.5 kilos of natriumnitrite is added. After having been allowed to stand for two hours, the solution of the thus formed diazoazo compound is gradually added to a neutral solution consisting of 6.5 kilos metatoluylenediamine and two hundred liters of water. The dye-stuff precipitates, is collected on a filter, washed with water, and dried. It is difficultly soluble in water. It dyes brown on non-mordanted cotton in a neutral bath, or, better, in a bath containing acetic acid. If toluylenediamine is substituted by metaphenylenediamine there is obtained a coloring-matter of a somewhat redder shade and of similar dyeing properties.

Similar coloring-matters are produced when amidoazo toluol, amidoazo-anisole, and the sulpho-acids of these amidoazo compounds are substituted for amidoazo-benzole.

What I claim as new and original, and desire to secure by Letters Patent, is—

The production of brown, reddish-brown, and brownish-violet coloring-matters, which dye directly unmordanted cotton by the action of metaphenylenediamine and metatoluylenediamine upon amidoazo-benzole or amidoazo-toluol or amidoazo-xylol or amidoazo-anisol.

In testimony whereof I have hereunto set my hand in the presence of two subscribing witnesses.

JOSEPH ROHNER.

Witnesses:
GEORGE GIFFORD,
ALPHONSE HECKENDORN.